United States Patent [19]

Kotani et al.

[11] Patent Number: 4,741,021

[45] Date of Patent: Apr. 26, 1988

[54] FACSIMILE DEVICE

[75] Inventors: Matahira Kotani, Nara; Motohiko Hayashi, Yamatokoriyama, both of Japan

[73] Assignee: Sharp Kabushiki Kaisha, Osaka, Japan

[21] Appl. No.: 829,926

[22] Filed: Feb. 18, 1986

[30] Foreign Application Priority Data

Feb. 18, 1985 [JP] Japan .................................. 60-30770
Feb. 18, 1985 [JP] Japan .................................. 60-30771

[51] Int. Cl.⁴ .......................................... H04M 11/00
[52] U.S. Cl. .................... 379/100; 379/355; 358/257
[58] Field of Search .................... 179/2 DP, 5 R, 5 P, 179/90 B, 90 BB, 90 BD; 379/100, 355, 93, 40, 356, 357, 96, 98; 358/257

[56] References Cited

U.S. PATENT DOCUMENTS

| | | | |
|---|---|---|---|
| 3,899,645 | 8/1975 | Brafman | 179/2 DP |
| 4,113,991 | 9/1978 | Gorham et al. | 179/90 B |
| 4,160,125 | 7/1979 | Bower et al. | 179/90 B |
| 4,492,820 | 1/1985 | Kennard et al. | 179/5 P |
| 4,524,393 | 6/1985 | Ohzeki | 358/257 |
| 4,532,379 | 7/1985 | Tsukioka | 179/2 DP |
| 4,581,656 | 4/1986 | Wada | 358/257 |
| 4,646,160 | 2/1987 | Iizuka et al. | 379/100 X |

FOREIGN PATENT DOCUMENTS 2141904 1/1985 United Kingdom ............ 179/2 DP

Primary Examiner—Jin F. Ng
Assistant Examiner—Mathew E. Connors
Attorney, Agent, or Firm—Birch, Stewart, Kolasch, & Birch

[57] ABSTRACT

A facsimile device with an automatic dialing signal transmission system, which includes a first memory circuit storing the phone numbers of the primary receiving station, and a second memory circuit storing the phone numbers of the secondary receiving stations which act as substitutes for the primary stations. A device is provided for detecting non-connection to the primary station that transmitted dialing signals in accordance with the phone numbers stored in the first memory circuit, and a device is also provided for automatically transmitting dialing signals by reading the phone numbers stored in the second memory circuit in response to the non-connection detector device mentioned above.

3 Claims, 4 Drawing Sheets

FACSIMILE DEVICE

BACKGROUND OF THE INVENTION

The present invention relates to a facsimile device with an automatic dial transmission device capable of automatically transmitting data to a secondary receiving station operating on behalf of the primary receiving station in the event that data cannot be transmitted to the latter.

Conventional facsimiles with automatic dial transmission systems automatically redial calls at specified intervals if data cannot be transmitted to the receiving station immediately. In the event that data cannot be transmitted to the receiving station after repeated automatic dialing, the operator is obliged to suspend data transmission until he can resume manual dialing.

SUMMARY OF THE INVENTION

To eliminate the above inconvenience, the present invention provides a facsimile device capable of minimizing the necessity for such repeat picture data transmission. When operating a facsimile with the automatic dial transmission device, if the facsimile cannot transmit data to the primary receiving station, it automatically dials a secondary receiving station. This secondary station located in the vicinity of the primary station, receives the data on its behalf, thus significantly reducing the need for repeat transmission of data by operators. Furthermore, the facsimile device reflecting the preferred embodiments of the present invention detects busy signals at the primary receiving station and, after counting a specified number of busy signals, automatically transmits data to the secondary receiving station. Considerable reductions in stand-by time prior to actually transmission result. Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the following detailed description.

Specifically, the present invention provides the facsimile device with an automatic dial transmission system including first memory means to store the phone numbers of the primary receiving station, a second memory means to store the phone number of the secondary receiving station, means for detecting non-connection to the primary receiving station in reply to the dialing signals corresponding to the dial number data stored in the first memory means, and means for reading the phone number stored in the second memory means in response to the signals from said non-connection state detector means before eventually activating the automatic dial transmission system incorporated therein.

The present invention provides this facsimile device with first memory means to store the phone number of the primary receiving station and second memory means to store the phone number of the secondary receiving station, means for detecting busy signals from the primary station in reply to the dialing signal corresponding to the dial number data stored in said first memory means and counting a specified number of busy signals, and means for reading the phone number stored in second memory means in response to the counting of said busy signals immediately before activating the automatic dial transmission.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
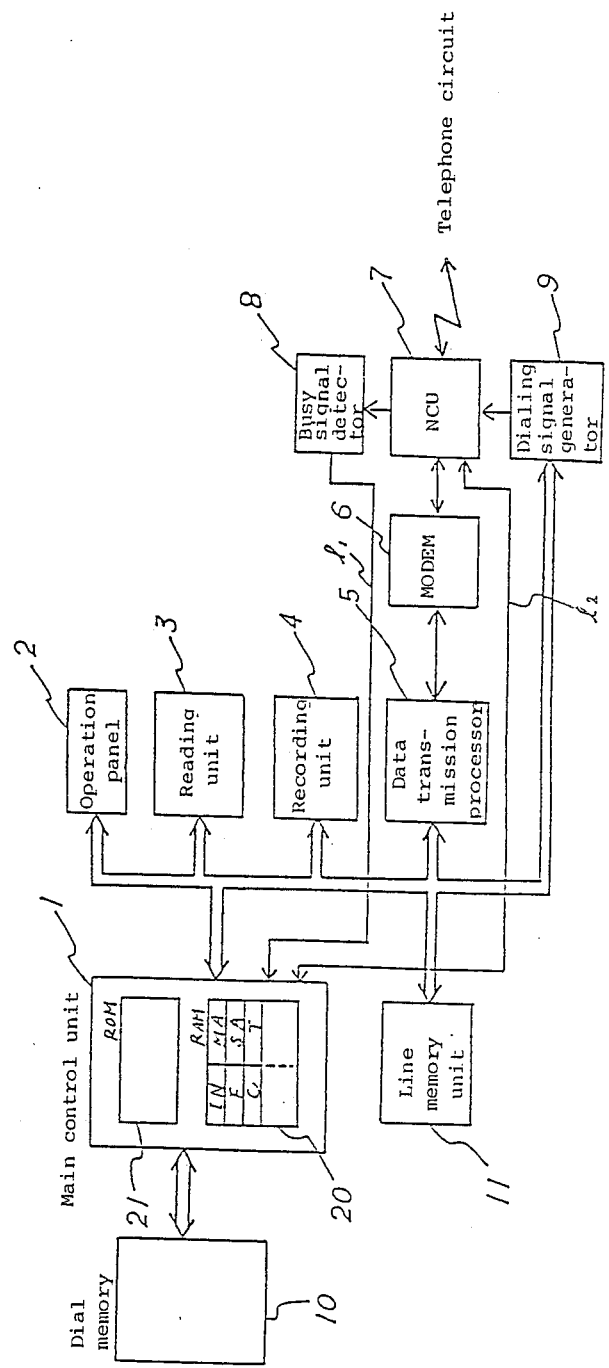
FIG. 1 is a simplified block diagram of the facsimile with the automatic dialing signal transmission device embodied by the present invention.

FIG. 1 is the simplified block diagram of the facsimile with the automatic dialing signal transmission device embodied by the present invention. The reference numeral 1 indicates a main control unit, which executes control over the entire facsimile system. The main control unit 1 is connected to a variety of operational units via a bus line, including an operation panel 2, a reader 3 which reads data on the draft, a recorder 4, which records received data, a data transmission processor 5 which transmits data in accordance with data transmission procedure predetermined by the transmitting and receiving stations, a dial signal generator 9, which forwards specific dial tones in response to the phone number delivered from the main control unit 1, and a line memory unit 11 which stores data to be either read by the reader 3 or received from the data transmission processor 5 for delivery to either the data transmission processor 5 or the recorder 4. The data transmission processor 5 is connected to a MODEM 6, which is also connected to the telephone circuit connected to the exchange via a network control unit (NCU) 7. When the telephone circuit is connected to the primary receiving station by dialing, the exchange reverses the polarity of the telephone circuit to confirm the signal from the said station, and the NCU 7 then delivers the signal to the main control unit 1 through the control bus line 12. The reference numeral 8 indicates a busy signal detector that detects the 400 Hz busy signal delivered from the exchange unit via the NCU 7 when the primary receiving station is busy. Simultaneous with the detection of the busy signals, the busy signal detector 8 outputs the busy detect signal to the main control unit 1 via the control bus line 11. The reference numeral 10 indicates a dial memory comprised of a RAM backed up by a battery, which stores the phone numbers of a plurality of subscriber stations by arranging the numbers in shortened form.

Figure 3:
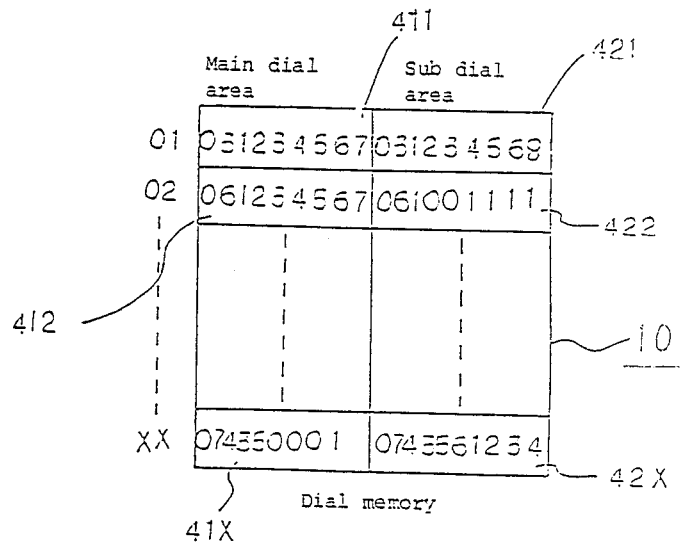
FIG. 3 is a diagram of the phone number memory of the automatic dialing signal transmission device.

As shown in FIG. 3, the dial memory 10 is provided with a plurality of memory areas to store phone numbers of the subscriber stations in shortened two-digit code numbers 01, 02 --xx). Each memory area is provided with the first memory areas 411, 412, --- 41X (main dial areas) storing the dial number most often called. With the second memory areas 421, 422, --- 42X (subordinate dial areas) storing numbers of the other receiving stations that can receive data as substitutes for the mainly available called-subscriber stations.

Figure 4:
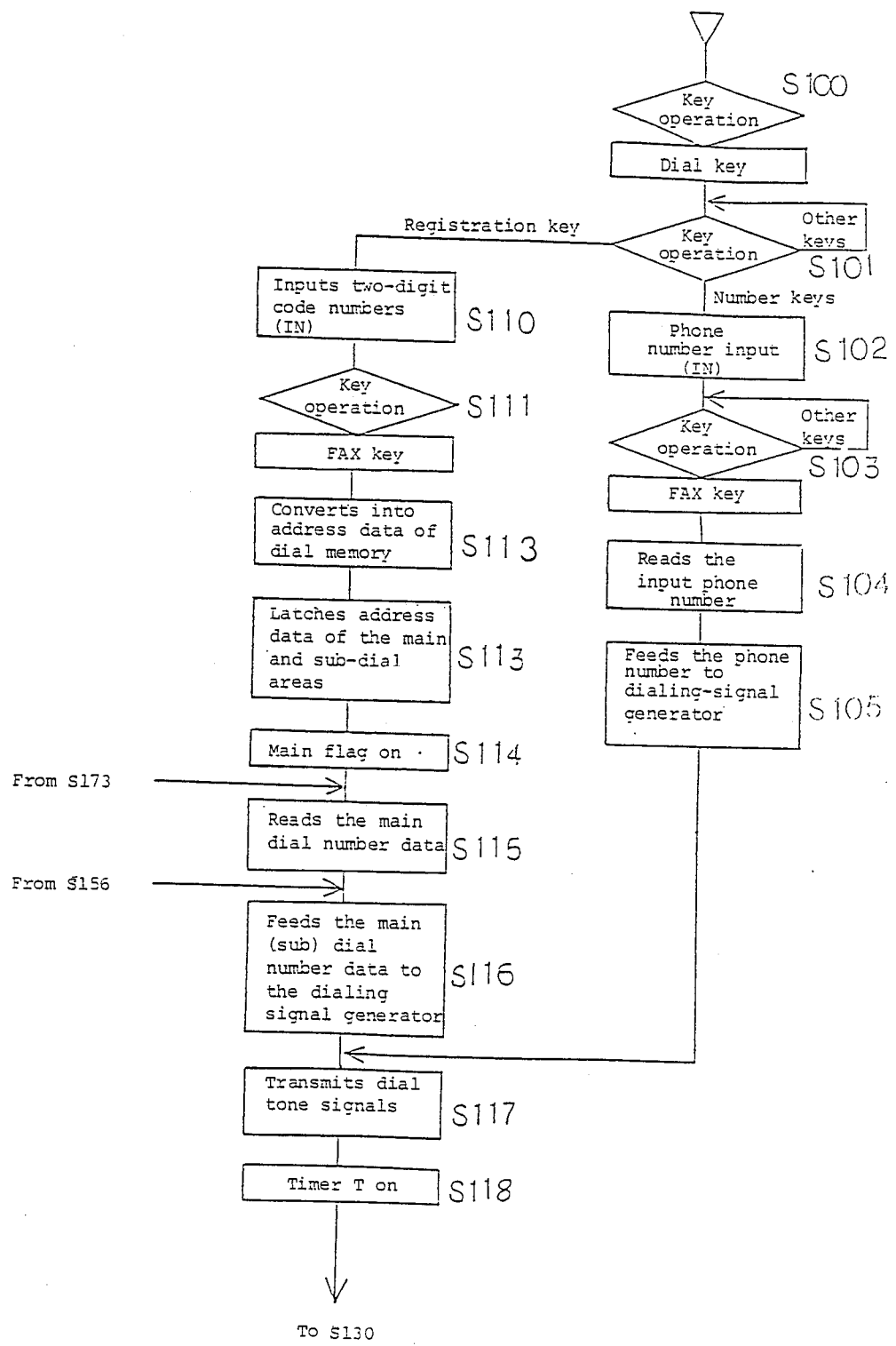
FIGS. 4 (A) and (B) are flowcharts of the operation of the automatic dialing signal transmission device of the present invention.
Figure 4:
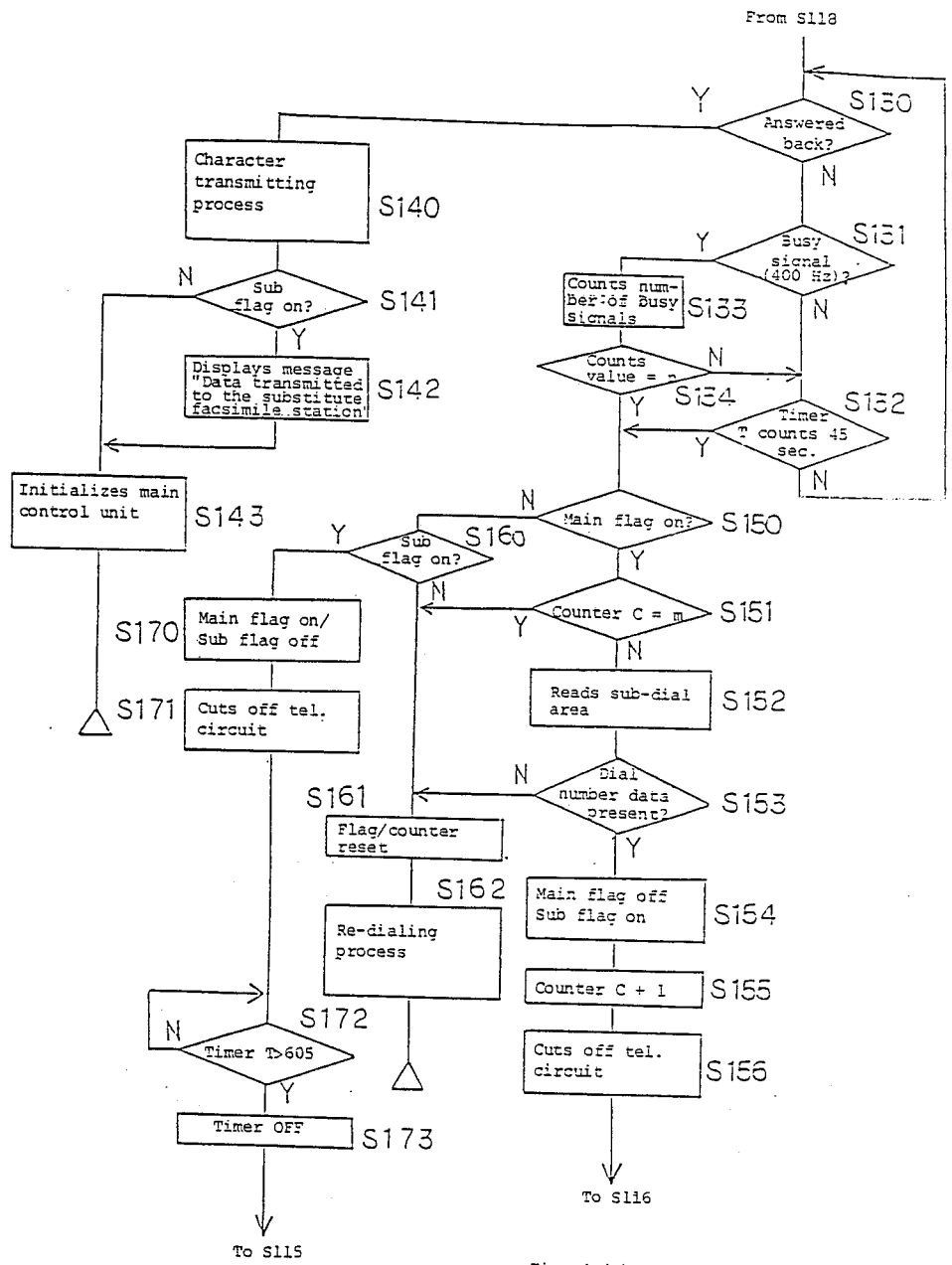

Upon receipt of the two-digit numbers, the main control unit 1 generates address data. Using this, either of the above memory areas is then accessed for reading the corresponding dial number data before this data is delivered to the main control unit 1. The main control unit 1 incorporates ROM 21 which stores system programs controlling the entire facsimile system and an address conversion table that generates access data for accessing the dial memory 10. FIGS. 4 (A) and (B) show the system programs related to the preferred embodiments of the present invention. In addition, the main control unit 1 also incorporates RAM 20 containing buffers (IN, MA, and SA,) a counter C, a timer T, and a flag F denoting the control conditions; all of these elements are made available for implementing the system control operation. Buffer IN temporarily stores the phone numbers which are input through number keys on the operation panel 2, whereas buffers MA and SA temporarily store address data generated by the above address conversion table and which is present in the main dial areas. Flag F consists of main and subordinate flags. Timer T is activated to control the transmission of dialing signals.

Figure 2:
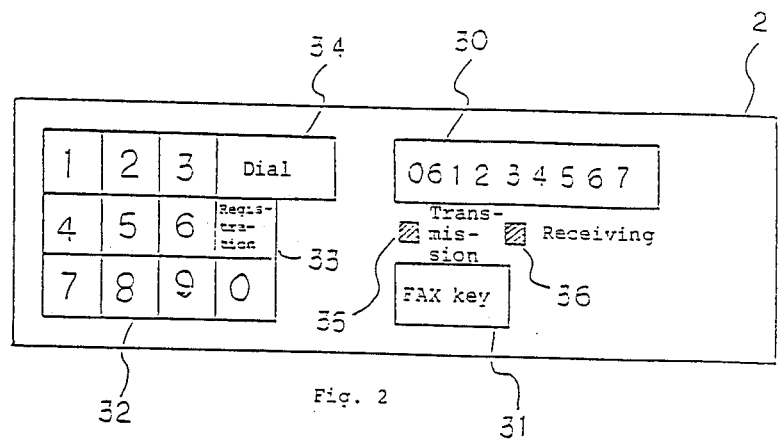
FIG. 2 is a schematic diagram of the operation unit of the automatic dialing signal transmission device.

The operations of the operation panel 2 shown in FIG. 2 are described below. Note that only part of the operating panel related to the present invention is shown in FIG. 2. The reference numeral 32 indicates number keys needed for entering either the shortened number or entire phone number of any receiving stations. Signals generated by the number keys are converted into corresponding binary codes, which are then delivered to the main control unit 1 and shown on the display unit 30. A registration key 33 is a control key for input of the shortened numbers.

A dial key 34 controls transmission of dialing signals to receiving stations. A facsimile key 31 is a control key for activating the data transmission process after designation of the phone numbers of the subscriber stations. The reference numeral 30 indicates a liquid crystal display unit which displays either numerals that are input via the number keys 10 or messages generated by ROM 21 of the main control unit 1. The reference numerals 35 and 36 are lamps indicating whether the facsimile unit is transmitting or receiving data.

Referring now to FIGS. 4 (A) and (B), operations of the facsimile device embodied by the present invention are described below. First, the method of registering numbers in the phone number memory 10 is described below. Following the depression of the registration key 33, when the operator inputs the shortened numbers by operating number keys 32, a specific memory area corresponding to these dial numbers is addressed. Next, when the operator inputs a 9- or 10-digit number of the receiving stations using the number keys and again depresses the registration key 33, the corresponding main dial memory area 41i stores the binary version of phone number. Next, when the operator inputs the phone number of a secondary receiving station, a corresponding subordinate memory area 42i stores the binary version of the phone number. Consequently, both of these numbers are registered together, corresponding to the shortened number input previously. On the other hand, no phone numbers are stored in the subordinate memory area 42i of a receiving station not provided with any secondary station. Instead, the subordinate dial memory 42i stores binary-coded numbers 11. Functional operations in respective modes are described below.

(1) SIGNAL TRANSMISSION BY MANUAL DIALING

See FIG. 4 (A). When the operator presses dial key 34 on the operation panel 2 for dialing, all the operations effective from step S100 are sequentially executed. Next, when the operator directly inputs the phone number of the receiving station using number keys 32, the entered number is stored in buffer IN and simultaneously appears on the display 30. After completing the entry of the phone number, the operator then depresses the FAX key 31. This allows the main control unit 1 to read the phone number from buffer IN, and it is then delivered to the dialing signal generator 9. The dialing signal generator 9 generates a specific dial tone corresponding to the identified phone number, then it delivers the dial tone signal to the telephone circuit via the NCU 7. These operations correspond to steps S101 through S105 and S117, respectively. Next, timer T is activated to allow the operation to proceed to step S130, shown in FIG. 4 (B). The main control unit 1 then identifies in step S130 whether or not NCU 7 receives the signal from the receiving station via the exchange whether the busy signal detector 8 correctly transmits the busy signal during step S131, or whether the timer T has counted 45 seconds during step S132. When the signal from NCU 7 is identified, (i.e., when the telephone circuit connected to the receiving station is open), according to the predetermined data transmission procedure, the data reader unit 3 reads the content of the document. This data is then stored in the line memory unit 11, and finally the facsimile system transmits the stored data to the primary receiving station via the data transmission processor unit 5, the MODEM 6, and the NCU 7 during step S140. After completing the transmission of all the picture data, the telephone circuit is closed and the main control unit 1 is reset to the initial state. Conversely, when no signal is returned and the main control unit receives the busy signal, causing the timer T to count the busy signals during steps S133 and S134, or when no signal is received from the receiving station and timer T counts 45 seconds, the operation mode then proceeds to step S150. In this example, since flag F remains set in the initial state, steps S150 and S160 respectively indicate no answer in the operation flowchart of FIG. 4. (B), thus causing both the flag F and the counter T to be reset. This causes the system to break off its connection to the telephone circuit and then enter a dial processing operation, that is, the system repeats the operations described above after a specified period of time.

(2) SIGNAL TRANSMISSION BY AUTOMATIC DIALING USING THE TWO-DIGIT CODE NUMBER

See FIG. 4 (A). When the operator presses the dial key 34 and the registration key 33, and then inputs the two-digit code dial number using number keys 32, the shortened number is stored in buffer IN and simultaneously shown on the display unit 30. Following the entry of the two-digit number, the operator depresses the FAX key 31 to activate the execution of all the operational modes effective from step S112 on. The binary version of the number stored in buffer IN is then converted into address data of both the main and subordinate dial areas of the dial memory 10 by means of the address conversion table of ROM 21 during step S112, and these address data are then latched by buffers MA and SA respectively during step S113.

Next, simultaneous with the activation of the main flag, the main dial area 41i is accessed in accordance with the address data latched in buffer MA. The main control unit 1 then reads the dial number data of the preregistered receiving station for delivery to the dialing signal generator 9. This allows the system to output the signals and simultaneously activate timer T (steps S114 through S118). The operation modes then proceed to those steps shown in FIG. 4 (B). Although not shown in the flowchart, if no dial number data is stored in the corresponding main dial memory area, the system identifies that the operation has been incorrectly executed, and the system returns to its initial state. In the flowchart shown in FIG. 4 (B), upon receipt of the signal from NCU 7, operations from S130 and S140 are executed to allow the transmission of data to the primary receiving station.

(A) OPERATIONS WHEN BUSY SIGNALS ARE DETECTED

When the busy signals are detected, the counter counts the number of busy signals. As soon as the predetermined number is reached, operations effective from step S150 on are executed. While these operations are underway, the main flag remains activated. The system checks to see whether the actual state of counter C (initial condition "0") and the actual counter value "m" (for example "3") match. If these numbers indicate No answers as in the cited example, in reference to the address data latched in buffer SA, the system accesses the subordinate memory area 42i during steps S150 through S152. The main control unit 1 then reads the phone number of the substitute receiving station from the subordinate memory area 42i and identifies whether or not the phone number is actually registered. If the desired phone number is not yet registered, in other words, if the data are composed of binary-code (11), operational modes effective from step S161 on are executed to allow re-dialing. Conversely, if the required phone number is stored, the system turns the main flag off, the subordinate flag on and then counter C. The system then disconnects the telephone circuit. These operations are executed during steps S154 through S156, after which the operation mode proceeds to step S116 shown in FIG. 4 (A). The main control unit 1 then delivers the phone number of the secondary receiving station retrieved from subordinate memory area 42i and sends it to the dialing signal generator 9 instructing it to transmit the dialing signal during steps S116 through S118. When the signal is received from the secondary receiving station, those operations effective from step S140 as shown in FIG. 4 (B) are executed for implementing the transmission of the picture data. After completing the transmission of the data, a message "All data has been transmitted to the secondary station" appears on the display unit 30. Accordingly, when the main control unit 1 identifies that the primary receiving station is busy, the main control unit 1 activates the facsimile system to immediately transmit dialing signals to a secondary station in the vicinity of the designated subscriber station, which will receive signals on its behalf. On the other hand, if the secondary receiving station is busy, the busy signal detector 8 delivers the busy signal to the main control unit 1, thus causing a repeat of steps S131, S133, S134 and S150. While these operational steps are underway, since the subordinate flag is activated as mentioned earlier, the operational mode proceeds from S160 to S170 to turn the main flag on and the subordinate flag off. At the same time, the system disconnects from the telephone circuit, and the entire system enters stand-by mode at step S172 until the timer T activated during step S118 of FIG. 4 (A) counts 60 seconds.

The main control unit 1 turns timer T off as soon as the counted time exceeds 60 seconds to allow the system operation to proceed to step S115 shown in FIG. 4 (B). This also inhibits the system from transmitting dialing signals to the secondary receiving station, and as a result, the facsimile system transmits the dialing signal to the primary subscriber station again. If neither the primary nor secondary subscriber stations can transmit dialing signals, the facsimile system repeats the operations described above until transmission of dialing signals can be executed. Operational steps S151 and S155 cause the dialing signals to be alternately and repeatedly executed "m" times (3 times, in the example). When the value of the counter C and the value "m" match at step S151 to cause the dialing signal of the main dial memory area 41i to be transmitted subsequently, the system discontinues the alternate dialing signal transmission and executes re-dialing operation. By execution of the re-dialing operations, the dialing signal transmission process is resumed after a specified period of time. Note that, when transmitting dialing signals to a receiving station which has failed to respond, it is necessary to provide the exchange with a minimum 60 seconds stand-by time for proper connection.

(B) WHEN TIMER T COUNTS UP 45 SECONDS

When the primary receiving station is in the process of calling up another station and no signal returns, timer T, which is activated in step S118, counts 45 seconds before causing the operational mode to proceed from step S132 shown in FIG. 4 (B) to step S150. As soon as timer T counts 45 seconds, the facsimile device embodied by the present invention activates the transmission of dialing signals to the secondary receiving station.

As is clear from the foregoing detailed description, the facsimile device incorporating the preferred embodiments of the present invention automatically activates the dialing signal transmission to a secondary receiving station, which receives incoming signals on behalf of the primary receiving station when it is occupied. As a result, the facsimile device embodied by the present invention minimizes the stand-by time until the designated dialing signal can actually be transmitted. Furthermore, the facsimile device of the present invention can potentially increase the number of secondary receivers for receiving dialing signals by providing the system with additional dial memory areas to store the dialing number data of secondary receiving stations. In addition, it is also possible for the system to reduce the capacity of dial memory by either defining the secondary station in terms of two-digit code numbers or by alloting special keys for the primary subscriber stations and the secondary receiving stations acting on their behalf. Furthermore, it is also possible to effectively apply the unique functions of the facsimile device as embodied by the present invention when the designated data cannot be transmitted due to any obstruction taking place while data transmission is underway.

While only certain embodiments of the present invention have been described, it will be apparent to those skilled in the art that various changes and modifications may be made therein without departing from the spirit and scope of the present invention as claimed.

What is claimed is:

1. A facsimile device with an automatic dialing signal transmission system comprising:

a dial memory means for containing first memory means and second memory means, each said first and second memory means containing a plurality of phone numbers, said plurality of phone numbers in said first memory means being greater than or equal to said plurality of phone numbers in said second memory means, said plurality of phone numbers in said first memory means each being for a primary receiving station, said plurality of phone numbers in said second memory each being for a secondary receiving station;

means for dialing one of said phone numbers in said first memory means in order to call the primary receiving station for said one phone number when a need arises to call the primary receiving station;

means for detecting nonconnection to said primary receiving station after said means for dialing dials said one phone number; and means for reading a phone number in said second memory associated with the one phone number of the first memory means dialed by said means for dialing, each of said phone numbers in said second memory means being associated with at least one of said plurality of phone numbers in said first memory means such that said secondary receiving stations act as substitutes to said primary receiving stations and such that connection of a call to a secondary receiving station obviates the need to call the associated primary receiving station, said means for reading being activated when said means for detecting determines nonconnection to said primary station, said means for dialing thereafter calling the associated phone number of the secondary receiving station read by the means for reading from the second memory means in response to nonconnection with the associated phone number of the first memory means.

2. The facsimile device defined in claim 1, in which said means for detecting nonconnection comprises a timer.

3. A facsimile device with an automatic dialing signal transmission system comprising:

a dial memory means for containing first memory means and second memory means, each said first and second memory means containing a plurality of phone numbers, said plurality of phone number in said first memory means being greater than or equal to said plurality of phone numbers in said second memory means, said plurality of phone numbers in said first memory means each being for a primary receiving station, said plurality of phone numbers in said second memory means each being for a secondary receiving station;

means for dialing one of said phone numbers in said first memory means in order to call the primary receiving station for said one phone number when a need arises to call the primary receiving station;

means for detecting busy signals from the primary receiving station dialed by said means for dialing, said means for detecting counting a predetermined number of busy signals; and means for reading a phone number in said second memory associated with the one phone number of the first memory dialed by said means for dialing, each of said phone numbers in said second memory means being associated with at least one of said plurality of phone numbers in said first memory means such that said secondary receiving stations act as substitutes to said primary receiving stations and such that connection of a call to a secondary receiving station obviates the need to call the associated primary receiving station, said means for reading being activated when said means for detecting receives busy signals from the primary receiving station dialed by said means for dialing, said means for dialing thereafter calling the associated phone number of the secondary receiving station read by the means for reading in response to receiving busy signals from the associated phone number of the first memory means.

* * * * *